(No Model.)
C. T. PORTER.
VALVE FOR STEAM ENGINES.
No. 368,422. Patented Aug. 16, 1887.
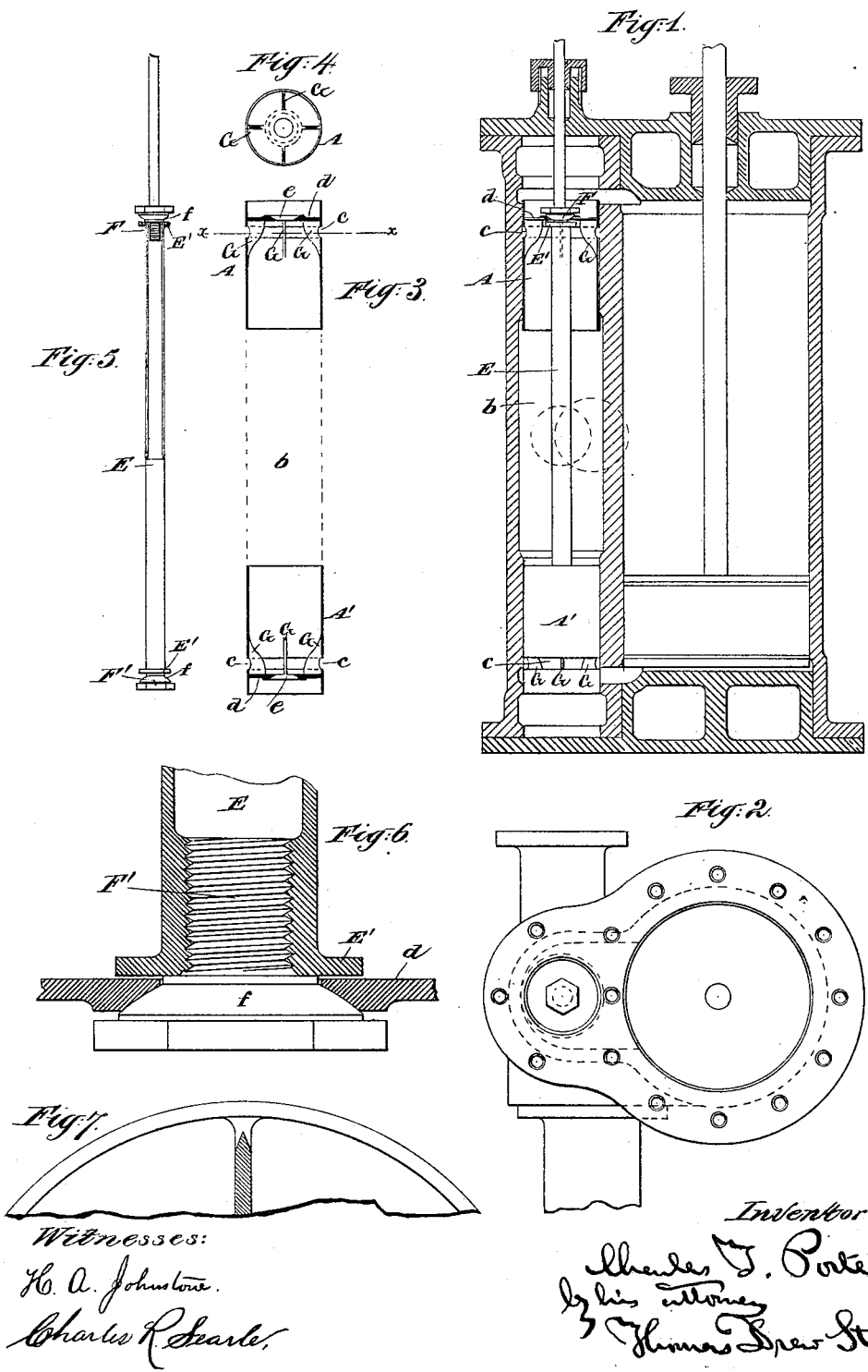
Witnesses:
H. A. Johnstone.
Charles R. Searle.
Inventor:
Charles T. Porter
by his attorney
Thomas Drew Stetson

UNITED STATES PATENT OFFICE.

CHARLES T. PORTER, OF NEW YORK, N. Y.

VALVE FOR STEAM-ENGINES.

SPECIFICATION forming part of Letters Patent No. 368,422, dated August 16, 1887.

Application filed July 29, 1886. Serial No. 209,412. (No model.)

*To all whom it may concern:*

Be it known that I, CHARLES T. PORTER, a citizen of the United States, residing in the city and county of New York, and State of New York, have invented a certain new and useful Improvement in Valves for Steam-Engines, of which the following is a specification.

This improvement relates to that form of steam-engine valve which is known as the "hollow piston-valve." This valve has heretofore usually been made as a single hollow casting, closed at the ends and with an opening or openings in the middle of its length for the passage of steam from the steam-pipe or to the exhaust-pipe, according as it is arranged in this respect, and with openings near each end for the passage through it of steam either to or from the ports of the engine. It is important that the end openings be opposite the cylinder-ports, requiring the valve to be nearly as long as the cylinder. It is not practicable under ordinary conditions to employ packing. The valve must closely fill the long seat.

The seat is liable to slight distortion of its form by curving through unequal expansion, especially while the engine is being warmed up in starting, due to the unequal heating of its opposite sides. This distortion tends to cause a seizure of the valve, requiring the exertion of much force to overcome it, while the friction abrades the surfaces and may involve the breaking of a valve-connection or some other important part and the crippling of the engine. Such liability to seizure increases with each increase in the length of the cylinder. I have discovered means of avoiding this difficulty, while still enjoying all the advantages of the hollow piston-valve and retaining substantially the present length of bearing, so as to maintain the tightness.

I will use the term "diaphragm" to denote the web of metal extending across the valve near each outer end. I divide the present long hollow piston-valve into two separate valves, omitting the middle portion, by which the ends have heretofore been commonly united, and connecting these instead by a central stem extending the whole length and attached to the diaphragm of each valve in the following manner: The stem is provided with collars on opposite sides of the diaphragms, one of which forms with each diaphragm a steam-tight joint, yet allowing liberty for the slight changes of alignment required.

The pressure of the steam, either within or without the valves, forces each valve firmly against one or the other of these collars. In this manner, while the pressure is on, the position of each valve is determined, the line of draft is made truly central, lost time or lost motion on reversal of the movement is impossible, and, a close fit being made, leakage around the stem is prevented. The corresponding collar on the opposite side of the diaphragm is nearly in contact with it, and thus prevents the valve from getting much out of place when the steam-pressure has been shut off and the engine is coming to rest, or even if conditions obtain which induce a momentary reversal of the pressure. The pressure of steam on the two valves, being in opposite directions and on equal areas, is always in equilibrium, and the valves move together precisely as they would do if they were united in one casting. It is important, also, that the portions of each valve on opposite sides of the passages from the interior of the valve to the port of the engine be rigidly united, and at the same time that the continuity of these passages around the valve be interrupted as little as possible. I accomplish these two objects by means of deep diagonal ribs united with the diaphragm on one side of each passage and with the cylindrical sides of the valve on the other side thereof. I make these ribs thin, the breadth extending radially, and make the inner edges sharp. The ribs do not appreciably obstruct the passage of the steam inward or outward through the entire opening quite around the valve.

The accompanying drawings form a part of this specification, and represent what I consider the best means of carrying out the invention.

Figure 1 is a longitudinal section through a cylinder and valve-chest. Fig. 2 is an end view of the same. Fig. 3 is a longitudinal section through the valves. Fig. 4 is a transverse section on the line x x in Fig. 3. Fig. 5 is a separate view of the valve-stem, the upper half being shown in longitudinal section and the lower half in elevation. Fig. 6 is on a larger scale, and is a longitudinal section through the lower end of the valve-stem, showing the plug screwed up firmly to the end of the stem and the adjacent portion of a valve. Fig. 7 is also on a larger scale, and is a cross-section.

Similar letters of reference indicate corresponding parts in all the figures where they occur.

A and A' represent the two valves in section. The vacant space $b$ between these valves corresponds in function to the ordinary apertures at this point for the admission or discharge through a suitable passage provided in the cylinder-casting of the steam passing through the valves to or from the cylinder. The openings $c\ c$ communicate with the ports of the cylinder when the motion of the valve brings them into the required positions, the same as the corresponding openings in an ordinary hollow piston-valve. The diaphragms $d\ d$ are, as usual, located outside the ports $c\ c$. The opening $e$ through the center of each diaphragm for the valve-stem is made large, so that in preparing the mold for the valve the parts of the core on opposite sides of the diaphragm $d$ may be properly united through it.

E is the valve-stem, made hollow, so as to combine stiffness with lightness, and also without unnecessary weight to fill the large openings $e$. The interiors of the ends are threaded to receive the screw-plugs F F', which are screwed firmly in, and one of which is prolonged to constitute part of the valve-stem by which the valve receives motion from valve-gear. (Not shown.) The heads of these plugs form the collars outside of the diaphragms $d\ d$. Each is formed with a collar having a spherical face. These plugs are screwed up firmly against the end of the stem E. The diaphragm $d$ is finished with a spherical concave matching to $f$. The surfaces of each being nicely finished, a steam-tight contact of the metals is obtained. Collars E' E' are formed on the hollow valve-stem E at or near each end, which constitute the collars to lie inside of and nearly touching the diaphragms.

The construction, while insuring a strong and reliable connection of the parts, allows all the freedom which is ever required for the slight obliquity of position of the valves A A'.

The strong pressure of the steam from within outward holds the valves A A' outward in steam-tight contact with the collars F' $f$ when the engine is made as here shown, or else (the engine being so arranged that the valve shall receive the steam from outside and exhaust from inside of the hollow piston-valve) the pressure of the steam urges the valves A A' inward into steam-tight contact with the collars E'. In either case the joint is steam-tight, and in either case the other collar, E', or F or F', is in position to hold the valve against misplacement whenever the engine shall make one or more revolutions with the steam shut off.

My invention is of service in allowing this desirable style of valve to serve reliably with light connections, and consequently with but little inertia, which is an important point in quick engines.

This kind of valve works theoretically without resistance. My invention aids to make it approximate such condition practically. As heretofore made there is always a more or less serious binding of the surfaces, approximating a seizure of the valve at each starting.

G G are thin ribs cast in one with the valves A A' and bridging across the passage or port $c$, which latter may be nicely finished by turning in a lathe. The ribs are sharpened on their outer edges, so that the steam finds a free passage past them outward and inward, and the whole area of the passage is available. These ribs form a strong and absolutely rigid connection between the parts of the valve on the two sides of the passage. The "lead and lap" may be determined with the same absolute accuracy as with other forms of valves. These ribs perform, also, an important function in taking hold of and stiffening the diaphragms $d$, which in large valves present considerable area and are subjected to great strain.

Modifications may be made in the forms and proportions. I can make the valves longer, so long as there is sufficient space between them to allow the steam to move out or in, as the case may be. I can make the bearing-surfaces and the adjacent concaves in the diaphragms parts of larger or smaller spheres. I can leave more or less space between the collars. It is sufficient that there shall be a little play, or, rather, that it shall be an easy bearing.

The valve-stem may be made solid. As shown, the parts are adapted to receive the strong steam between the valves and to discharge the exhaust-steam from the end spaces through any suitable passages leading therefrom. (Not shown.) If the engine is organized to work under the opposite condition—that is to say, with the strong steam on the ends of the valve and the exhaust-steam between—it will follow that the valves will be forced together instead of apart. In such case the spherical bearing will be formed on the outer faces of the collars E', and the corresponding concaves in the diaphragms will be made on the inner faces.

I claim as my invention—

In an engine having a cylindrical valve-seat, the two piston-valves A A', serving for the admission and release of the steam at the corresponding ends of the cylinder, in combination with a central stem and means, as the collars E' F f, for attaching the valves thereto, compelling them to move together, but allowing them to assume slightly-oblique positions, while maintaining a steam-tight connection with the stem, substantially as herein specified.

In testimony whereof I have hereunto set my hand, at New York city, this 7th day of July, 1886, in the presence of two subscribing witnesses.

CHARLES T. PORTER.

Witnesses:
F. A. RICHMOND,
M. F. BOYLE.